Mar. 3, 1925.
E. E. WEIRICK
1,528,713
ADJUSTABLE CASSEROLE FRAME
Filed July 25, 1923
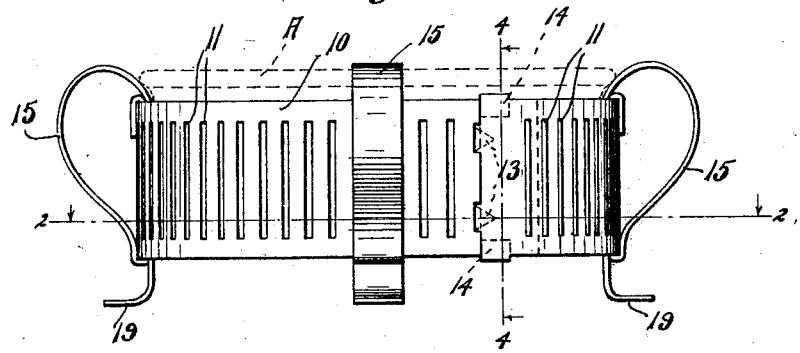
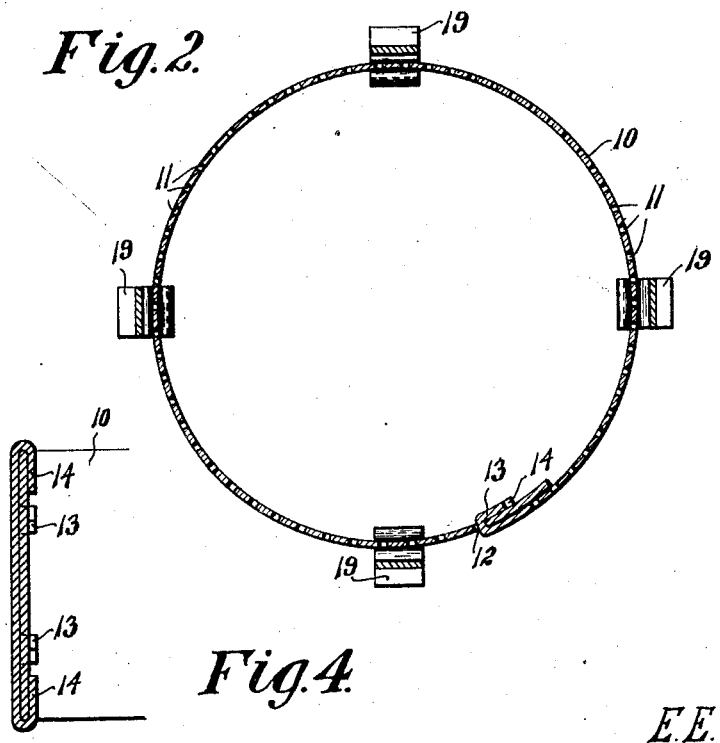
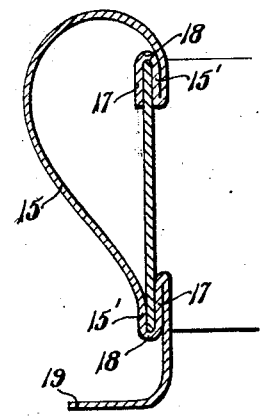
E. E. Weirick.
INVENTOR Patented Mar. 3, 1925.

1,528,713

UNITED STATES PATENT OFFICE.

ELLA E. WEIRICK, OF LINCOLN, CALIFORNIA.

ADJUSTABLE CASSEROLE FRAME.

Application filed July 25, 1923. Serial No. 653,748.

*To all whom it may concern:*

Be it known that I, ELLA E. WEIRICK, a citizen of the United States, residing at Lincoln, in the county of Placer and State of California, have invented new and useful Improvements in Adjustable Casserole Frames, of which the following is a specification.

This invention relates to kitchen and table articles and has for its object the provision of a novel casserole frame which is adjustable, or in other words the metallic shell within which the earthenware or other pan or dish is supported is made expansible or contractible so that the band will accommodate and hold pans or dishes of different diameters.

Another object is the provision of a device of this character which is equipped with a series of combined feet and handles which are slidably mounted upon the band so as to be moved when necessary to space them at equal distances apart.

An additional object is the provision of a device of this character which will be simple and inexpensive in manufacture, convenient in use, durable in service and a general improvement in the art.

With the above and other objects and advantages in view the invention consists in the details of construction to be hereinafter more full described and claimed and illustrated in the accompanying drawings, in which:

Figure 1 is a side elevation of the device,

Figure 2 is a top plan view thereof,

Figure 3 is a detail cross sectional view showing the connection of the overlapping ends of the band, and Figure 4 is a detail cross sectional view showing an edge view of one of the combined feet and handles.

Referring more particularly to the drawings the letter A designates the usual type of baking pan which is used in connection with a metallic band or shell to constitute what is known as a casserole frame. Ordinarily the metallic band or shell is incapable of use with a pan other than one of a certain definite size. In carrying out my invention I provide a band or shell 10 which is adjustable whereby to be capable of use with different baking pans. This shell 10 is formed from a single strip of suitable sheet metal which is nickel plated or otherwise finished to present a neat and attractive appearance. As is customary the band 10 is formed with a series of slots or perforations 11 which permit the escape of heat from the baking pan so as to avoid concentrating the heat within the shell and consequently blistering the table on which the casserole is set. At one end the band 10 is formed with a pair of spaced slots 12 and at its other end it is provided with a pair of prongs or tines 13 spaced the same distance apart as the slots 12. This second mentioned end of the band is formed at its upper and lower edges with retaining tongues 14 which are bent backwardly and which are slidably engaged upon the upper and lower edges of the other end of the band. By this construction it will be seen that when the tines 13 are engaged within the slots 12 the band forms a pan holding shell of maximum size and the size may be decreased by disengaging the tines 13 from the slots 12 and engaging them within any selected one of the slots 11.

To facilitate handling the casserole, I provide a plurality of combined feet and handles designated broadly by the numeral 15. Each of these members is formed from a single strip of resilient metal curved as shown and having its ends bent as indicated at 15 and rebent as shown at 17 to define hooks 18 which are engaged upon the upper and lower edges of the band. The lower ends of these handles are formed with outwardly bent extensions 19 which constitute supporting feet for supporting the casserole in such a position that the bottom edges of the band will be spaced above the table or other support on which the device is set.

In the use of the device it is of course apparent that the band is initially adjusted to be capable of receiving a baking pan of the desired size, so that when the pan is removed from the oven it may be slipped right into the shell formed by the band and be ready for serving. The detachable handles provide very efficient means for facilitating the transportation of the device from place to place without danger of burning the operator's fingers and without any great danger of dropping.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. In a casserole, a support shell for a baking pan formed from a single strip of sheet metal having its ends slidably detachably connected whereby to vary the diameter of the shell, and combined foot and handle members detachably and slidably engaged upon the shell, each formed from a single strip of resilient metal formed with hooks engaging upon the upper and lower edges of the shell, said members terminating at their lower ends in lateral and outward extensions which constitute feet.

2. In a supporting device for baking pans, a shell member formed from a single length of resilient metal having its ends overlapped and provided with adjustable means for varying the diameter, and a plurality of combined handles and supporting feet on said shell at spaced intervals, each of said combined handles and supporting feet being formed from a single strip of resilient metal bent intermediate its ends to define an outstanding partial loop, terminating at its lower end in a laterally extending element and further bent to define a pair of U-shaped guide elements extending toward each other and embracingly engaging upon the upper and lower edges of the shell.

In testimony whereof I affix my signature.

ELLA E. WEIRICK.